(12) United States Patent
Tsai

(10) Patent No.: US 8,159,772 B2
(45) Date of Patent: Apr. 17, 2012

(54) FOLDABLE PORTABLE ELECTRONIC DEVICE AND SYSTEM AND METHOD FOR PROTECTING HARD DISK

(75) Inventor: Ping-Yen Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 299 days.

(21) Appl. No.: 12/504,086

(22) Filed: Jul. 16, 2009

(65) Prior Publication Data

US 2010/0046343 A1    Feb. 25, 2010

(30) Foreign Application Priority Data

Aug. 22, 2008   (TW) ................................ 97132048 A

(51) Int. Cl.
*G11B 19/08* (2006.01)
*G11B 21/12* (2006.01)
(52) U.S. Cl. ......................................... 360/75; 713/320
(58) Field of Classification Search .................. None
See application file for complete search history.

(56) References Cited

U.S. PATENT DOCUMENTS

| | | | | |
|---|---|---|---|---|
| 5,227,929 A | * | 7/1993 | Comerford | 360/75 |
| 5,253,129 A | * | 10/1993 | Blackborow et al. | 360/69 |
| 5,781,780 A | * | 7/1998 | Walsh et al. | 713/300 |
| 6,873,367 B1 | * | 3/2005 | Hirata et al. | 348/372 |
| 8,015,421 B2 | * | 9/2011 | Chang | 713/320 |
| 2007/0123324 A1 | * | 5/2007 | Sato et al. | 455/575.3 |
| 2007/0206019 A1 | * | 9/2007 | Adachi | 345/520 |

* cited by examiner

*Primary Examiner* — Hoa T Nguyen
*Assistant Examiner* — James L Habermehl
(74) *Attorney, Agent, or Firm* — Rosenberg, Klein & Lee

(57) ABSTRACT

A foldable portable electronic device, a system and a method for protecting a built-in hard disk thereof are disclosed. The foldable portable electronic device includes a display and a main body. The system includes a trigger, a lid switch, and a logic judgment module. When the foldable portable electronic device is away form a flat surface, the trigger generates a first signal; when the display is folded onto the main body, the lid switch generates a second signal. The logic judgment module determines the method to control and protect the hard disk in accordance with the first signal and the second signal.

8 Claims, 3 Drawing Sheets

FOLDABLE PORTABLE ELECTRONIC DEVICE AND SYSTEM AND METHOD FOR PROTECTING HARD DISK

BACKGROUND OF THE INVENTION

1. Field of the Invention

The invention relates to a foldable portable electronic device and a system and method for protecting a hard disk thereof and, more particularly, to a system and method for protecting a hard disk used in the foldable portable electronic device.

2. Description of the Related Art

A foldable portable electronic device such as a notebook computer includes a display and a main body. The display and the main body are pivotally connected with each other, and therefore they may be folded in a closed state or may be operated an open state.

Generally, when the notebook computer is operated in the open state, the main body usually lies on a plat surface, and the display stands for users to watch it conveniently. A hard disk is usually set in the main body.

The notebook computer is required to be carried conveniently. Therefore, though the notebook computer often lies on a steady plat surface when it is operated, it is commonly seen that an operator folds the notebook computer and takes it to another place without shutting it down. If the notebook computer is carried improperly and vibrated, and the magnetic read/write head of the hard disk is not parked at that moment, the magnetic read/write head may collide with the magnetic disc to destroy data recorded thereon. Sometimes the value of the destroyed data may be far higher than that of the damaged hard disk.

A conventional solution is to set a chip of tri-axis digital accelerometer in the notebook computer, and the chip is used to detect acceleration generated from instant movement to determine whether or not the notebook computer is moved or vibrated. However, the solution not only need high cost of components, and it only considers the vibration directly instead of operators' action, so that it may not meet actual demands.

Therefore, to solve such above problems, the invention relates to a system and method for protecting a hard disk for a foldable portable electronic device.

BRIEF SUMMARY OF THE INVENTION

The invention provides a folded portable electronic device and a system and method for protecting a hard disk for the foldable portable electronic device, which protects the hard disk in accordance with the operation custom of users.

The invention relates to a foldable portable electronic device and a system and method for protecting a hard disk thereof. The foldable portable electronic device includes a display and a main body. The hard disk protecting system includes a trigger, a lid switch, and a logic judgment module.

The trigger is disposed at the bottom of the foldable portable electronic device. When the foldable portable electronic device is away form the flat surface on which it lies, the trigger is not abutted against and generates a first signal.

The lid switch is disposed at the display, and when the display is folded to cover the main body, the lid switch generates a second signal.

The logic judgment module is disposed in the foldable portable electronic device, and the logic judgment module compares a default program procedure according to the first signal and the second signal and controls the hard disk via a hard disk protection procedure according to program mechanism.

The hard disk protecting system in the invention is adapted for a foldable portable electronic device which includes a hard disk, a trigger, and a lid switch. The trigger generates a first signal when it is not abutted against, and the lid switch generates a second signal when it is abutted against. The method for protecting a hard disk includes the steps of: starting the foldable portable electronic device and running the hard disk, starting the hard disk protection procedure when the first signal and the second signal are both generated, and closing down the hard disk protection procedure when any one of the two signals disappears.

Therefore, since a foldable portable electronic device and a system and method for protecting a hard disk thereof utilize the cooperation of a trigger and a lid switch to meet users' customs of operating a foldable portable electronic device and to protect a hard disk.

These and other features, aspects and advantages of the present invention will become better understood with regard to the following description, appended claims, and accompanying drawings.

DETAILED DESCRIPTION OF THE EMBODIMENTS

Figure 1:
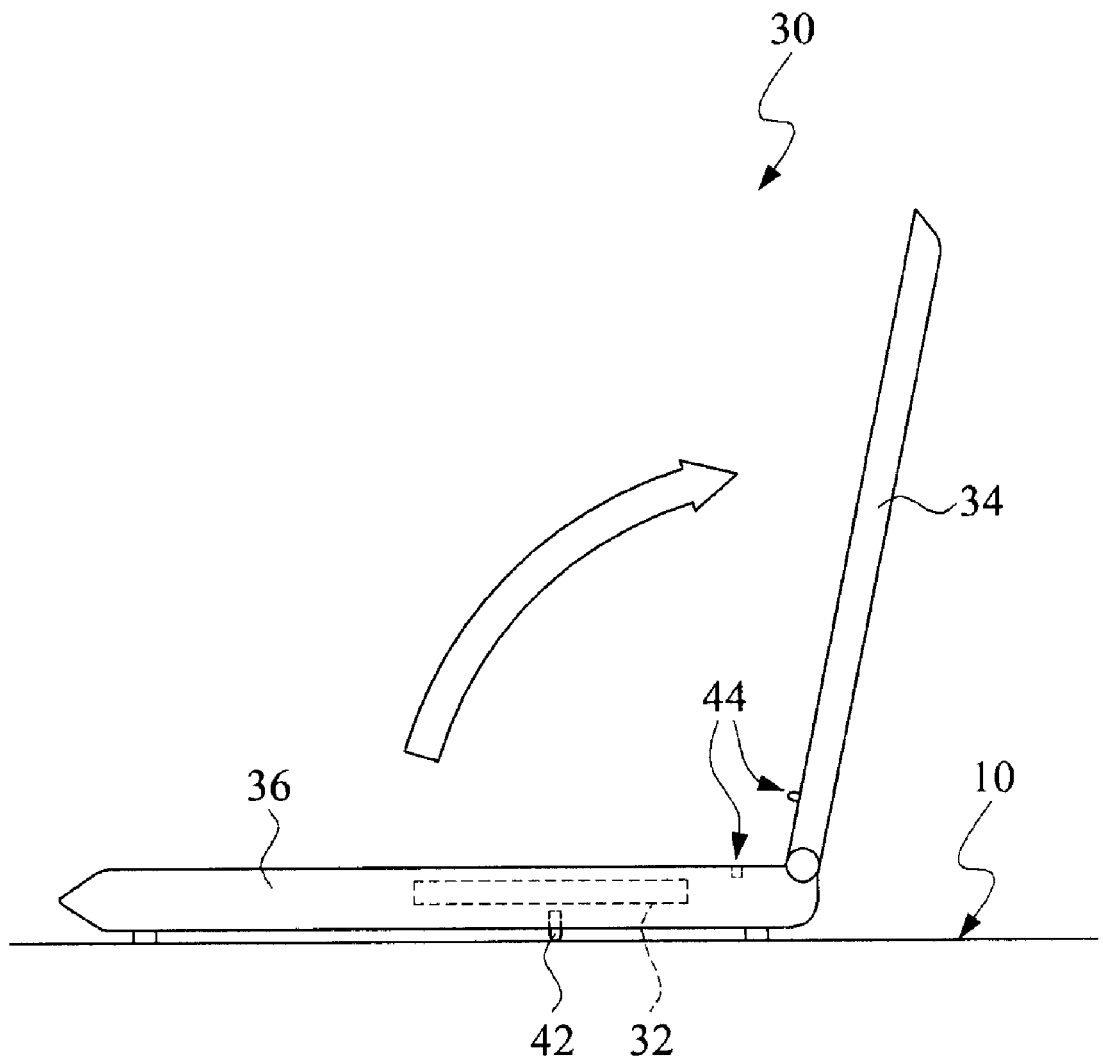
FIG. 1 is a schematic diagram showing a foldable portable electronic device according to the present invention.

FIG. 1 is a schematic diagram showing a foldable portable electronic device 30 according to a preferred embodiment of the present invention. The invention relates to a foldable portable electronic device 30 and a system and method for protecting a hard disk thereof, and the system and method are provided for protecting a hard disk 32 in a foldable portable electronic device 30 which is, for example, a notebook computer. The foldable portable electronic device 30 includes a display 34, a main body 36, and a hard disk 32. The display 34 and the main body 36 can be folded or opened, and no matter which state they are in, the foldable portable electronic device 30 lies on a flat surface 10 with the main body 36 as a base. The hard disk 32 is disposed in the main body 36 generally.

FIG. 1 shows the foldable portable electronic device 30 in an open state. A trigger 42 is disposed at the bottom of the foldable portable electronic device 30 and abuts against the flat surface 10. A lid switch 44 is disposed at the display 34 and abuts against the display 44 and the main body 36 in closed state.

Figure 2:
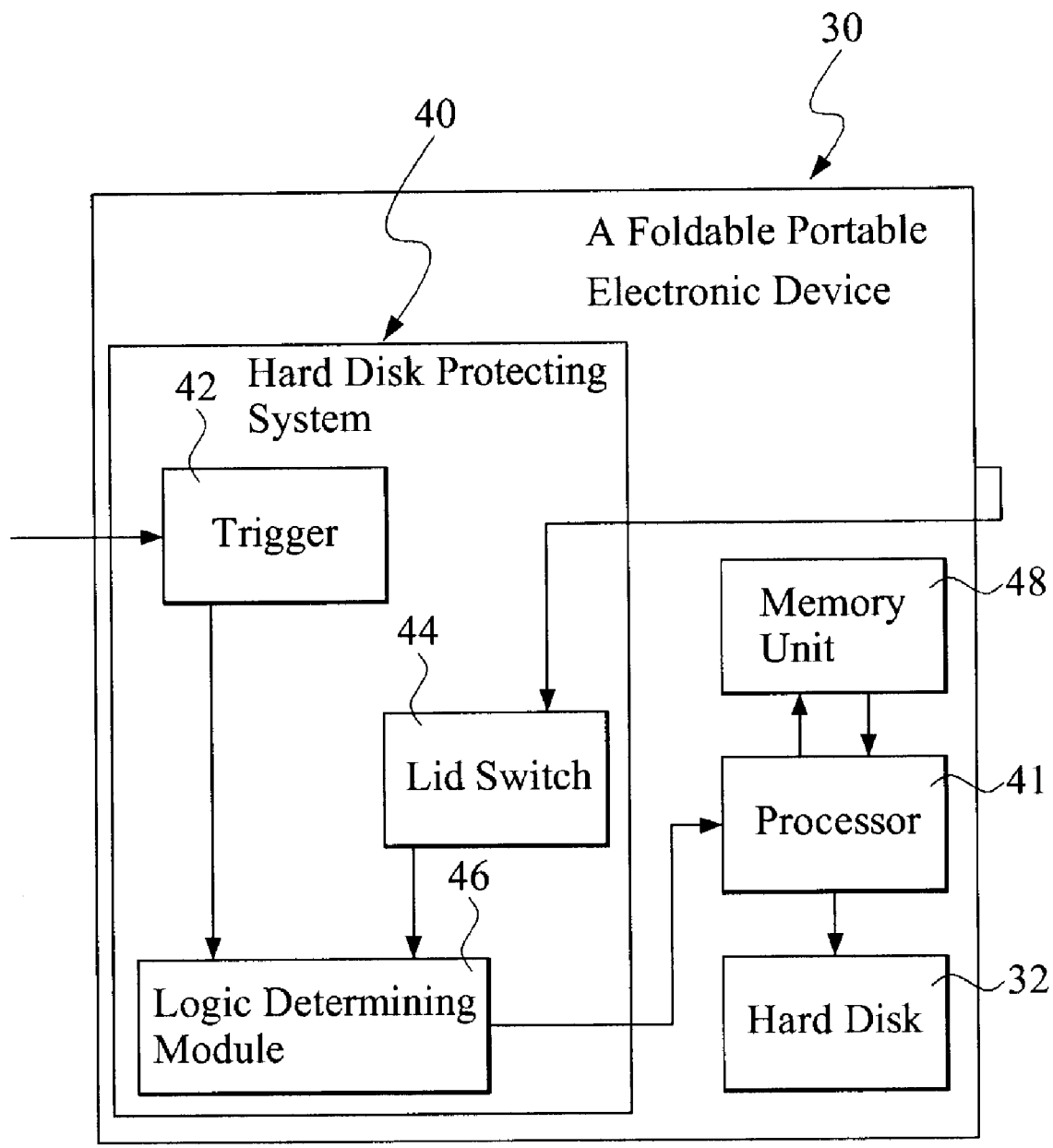
FIG. 2 is a block diagram showing a hard disk protecting system according to the present invention.

FIG. 2 is a block diagram showing a hard disk protecting system according to a preferred embodiment of the present invention. A hard disk protecting system 40 is set in the foldable portable electronic device 30, and it includes a trigger 42, a lid switch 44, and a logic judgment module 46.

The trigger 42 is a push switch, and practically when it abuts against the plat surface 10 it generates a signal. When the foldable portable electronic device 30 is away from the flat surface 10 on which it lies, an electronic signal is changed in the trigger 42 duo to the losing of abutment from the flat surface 10, which is regarded as that the trigger 42 generates a first signal. When the display 34 is folded onto the main body 36, the lid switch 44 is touched to generate a second signal.

The logic judgment module 46 is disposed in the foldable portable electronic device 30, and it is written by a programming language and stored in a memory with the cooperation of related circuits and electronic elements. The logic judgment module 46 compares a program mechanism preinstalled in a memory unit 48 via the processor 41 according to the first signal and the second signal and control the hard disk 32 by a hard disk protection procedure via the processor 41. The hard disk protection procedure is parking the magnetic read/write head with respect to the structure of a conventional hard disk 32.

More description concerns on the program mechanism. The program mechanism is stored in the memory unit 48 of the foldable portable electronic device 30, and it is starting the hard disk protection which means stopping running the hard disk 32 when the first signal and the second signal are both generated, and closing down the hard disk protection procedure which means restarting the hard disk 32 when any one of the two signals disappears.

Figure 3:
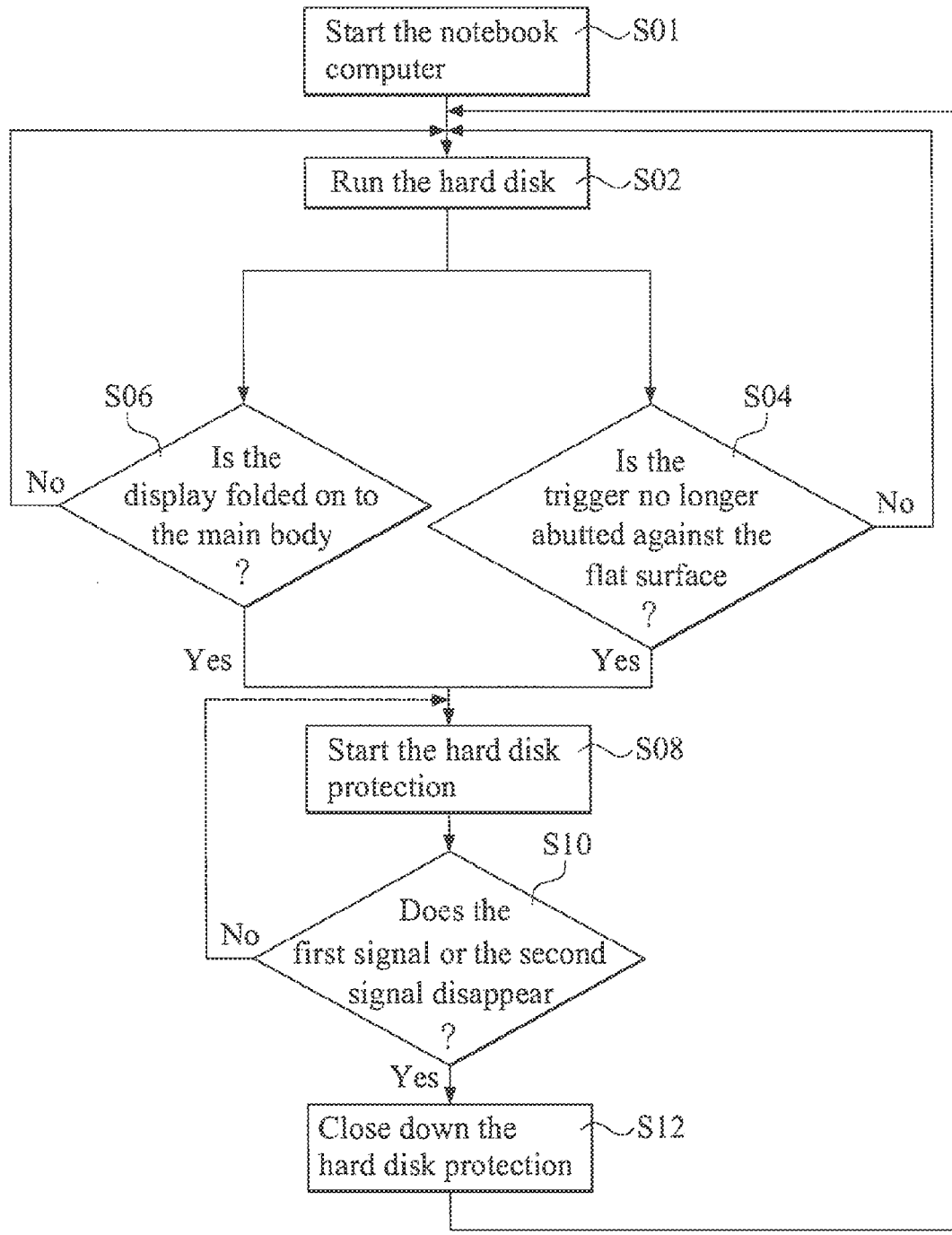
FIG. 3 is a flow chart showing a method for protecting a hard disk according to the present invention.

FIG. 3 is a flow chart showing a method for protecting a hard disk according to the present invention. The method is also a hard disk protecting method implemented by the hard disk protecting system described above. And the method is provided for protecting a hard disk 32 in a foldable portable electronic device 30 which is, for example, a notebook computer. The method includes the following steps.

In step S01, the foldable portable electronic device 30 is stared.

In step S02, the hard disk 32 is run.

In step S04, whether or not the trigger 42 is abutted against by the flat surface 10 is determined. When the foldable portable electronic device 10 is away form the flat surface 10 on which it lies, the trigger is not abutted against by the flat surface 10 and generates a first signal.

In step S06, whether or not the display 34 is folded onto the main body 36 is determined. When the display 34 is folded onto the main body 36, the lid switch 44 between the display 34 and the main body 36 is touched and generates a second signal.

In step S08, when the foldable portable electronic device 10 is away form the flat surface 10, and the display 34 is folded onto the main body 36, that is, when the first signal and the second signal are both generated, a hard disk protection procedure is started to control the hard disk 32. The hard disk protection procedure is parking the magnetic read/write head of the hard disk 32.

In step S10, whether or not any one of the first signal and the second signal disappears is determined.

In step S12, the hard disk protection procedure is closed down to control the hard disk 32 when at least one of the two signals disappears, and the step S02 is performed to run the hard disk 32.

Therefore, since a foldable portable electronic device 30 and a system 40 and method for protecting a hard disk thereof utilize the cooperation of a trigger 42 and a lid switch 44 to meet users' customs of operating a foldable portable electronic device and to protect a hard disk 32.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A hard disk protecting system, adapted for a foldable portable electronic device, wherein the foldable portable electronic device includes a hard disk, a display, a memory unit storing a program mechanism, and a main body, the hard disk protecting system comprising:
   a trigger disposed at the bottom of the foldable portable electronic device and generating a first signal when the trigger is not abutted against;
   a lid switch disposed at the display and generating a second signal when the lid switch is abutted against;
   a logic determining module disposed in the foldable portable electronic device, wherein the logic determining module compares a default program procedure according to the first signal and the second signal and determines whether to start a hard disk protection procedure in accordance with the comparing result; and
   wherein, when the first signal and the second signal are both generated, the program mechanism starts the hard disk protection procedure, and when one of the first signal and the second signal disappears, the program mechanism closes down the hard disk protection procedure.

2. The hard disk protecting system according to claim 1, wherein the hard disk protection procedure is parking the magnetic read/write head of the hard disk.

3. The hard disk protecting system according to claim 1, wherein the foldable portable electronic device is a notebook computer.

4. A foldable portable electronic device, comprising:
   a display;
   a main body pivotally connected with the display;
   a hard disk;
   a trigger disposed at the bottom of the foldable portable electronic device and generating a first signal when the trigger is not abutted against;
   a lid switch disposed at the display and generating a second signal when the lid switch is abutted against;
   a logic determining module, wherein the logic judgment module compares a default program procedure according to the first signal and the second signal and determines whether to start a hard disk protection procedure in accordance with the comparing result; and
   a memory unit storing a program mechanism, which starts the hard disk protection procedure when the first signal and the second signal are both generated, and which closes down the hard disk protection procedure when any one of the first signal and the second signal disappears.

5. The foldable portable electronic device according to claim 4, wherein the hard disk protection procedure is parking the magnetic read/write head of the hard disk.

6. The foldable portable electronic device according to claim 4, wherein the foldable portable electronic device is a notebook computer.

7. A method for protecting a hard disk, adapted for a foldable portable electronic device including the hard disk, a trigger, and a lid switch, wherein the trigger generates a first signal when the trigger is not abutted against, and the lid switch generates a second signal when the lid switch is abutted against, the method comprising the steps of:
   starting the foldable portable electronic device and running the hard disk;
   starting a program mechanism for monitoring the first signal and the second signal;

starting a hard disk protection procedure under the direction of the program mechanism when the first signal and the second signal are both generated; and closing down the hard disk protection procedure under the direction of the program mechanism when one of the first signal and the second signal disappears.

8. The method for protecting the hard disk according to claim 7, wherein the hard disk protection procedure is parking the magnetic read/write head of the hard disk.

* * * * *